United States Patent
Moore et al.

[19]

[11] Patent Number: 5,861,580
[45] Date of Patent: Jan. 19, 1999

[54] LOAD CELL AND WEIGHING SYSTEM

[75] Inventors: Ronald Brien Moore, Houston; Lloyd Glynn Paige, Crosby, both of Tex.

[73] Assignee: S' More, Inc., Crosby, Tex.

[21] Appl. No.: 492,739

[22] Filed: Jun. 21, 1995

[51] Int. Cl.⁶ .......................... G01G 19/08; G01G 19/52; B65G 9/00
[52] U.S. Cl. .......................... 177/136; 177/229; 177/139; 177/141; 177/146
[58] Field of Search ...................................... 177/139, 145, 177/141, 136, 147, 229, 146; 414/21, 607, 663, 917

[56] References Cited

U.S. PATENT DOCUMENTS

| | | |
|---|---|---|
| 1,474,464 | 12/1923 | Dallas . |
| 2,935,213 | 6/1960 | Cellitti et al. ................................ 214/2 |
| 3,059,710 | 10/1962 | Pien ........................................ 177/136 |
| 3,063,576 | 11/1962 | Hofmeister .................................. 214/2 |
| 3,196,966 | 7/1965 | Kennedy ................................. 177/139 |
| 3,910,363 | 10/1975 | Airesman ................................. 177/139 |
| 4,323,132 | 4/1982 | Bradley .................................... 177/139 |
| 4,420,053 | 12/1983 | Russo ...................................... 177/139 |
| 4,421,186 | 12/1983 | Bradley .................................... 177/139 |
| 4,638,876 | 1/1987 | Balduin et al. ........................... 177/139 |
| 4,645,018 | 2/1987 | Garbade et al. ............................. 177/6 |
| 4,666,004 | 5/1987 | Raz ......................................... 177/139 |
| 4,714,122 | 12/1987 | Appleton et al. ......................... 177/139 |
| 4,771,837 | 9/1988 | Appleton et al. ......................... 177/139 |
| 4,854,406 | 8/1989 | Appleton et al. ......................... 177/139 |
| 4,899,840 | 2/1990 | Boubille .................................. 177/139 |
| 5,245,137 | 9/1993 | Bowman et al. ......................... 177/139 |
| 5,304,745 | 4/1994 | Rusk et al. ................................ 177/50 |

*Primary Examiner*—Michael L. Gellner
*Assistant Examiner*—Anh Mai
*Attorney, Agent, or Firm*—Kurt S. Myers

[57] ABSTRACT

The present invention is directed to a novel load cell for weighing heavy loads and a weighing system using the novel load cells on a vehicle, such as a refuse truck. More specifically, the present invention is directed to a weighing system on a front-end loader refuse truck for weighing scrap metals or trash in boxes or containers lifted by arms or forks on which a plurality of the novel load cells are mounted. In addition, a protection mechanism may be activated to protect the load cells from a falling container when the container is lifted over the truck for dumping the contents into the truck or when the arms or forks are placed into the sleeves of the container to be weighed.

16 Claims, 3 Drawing Sheets

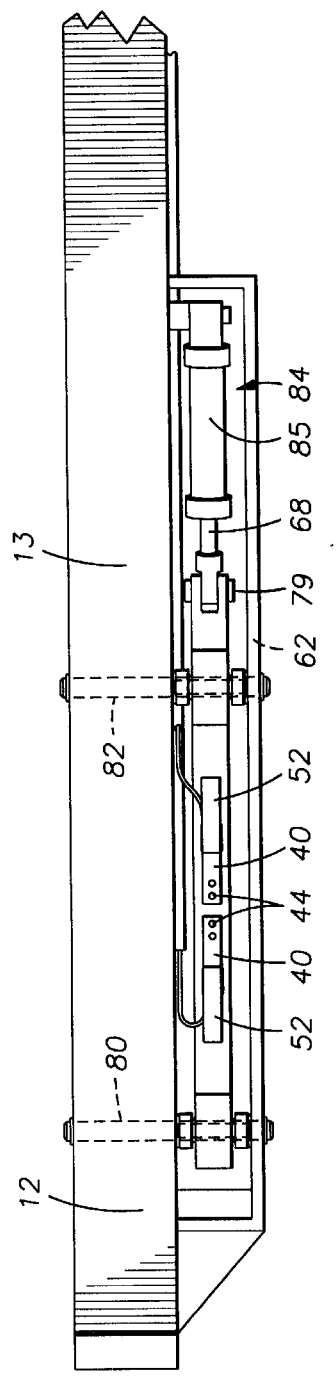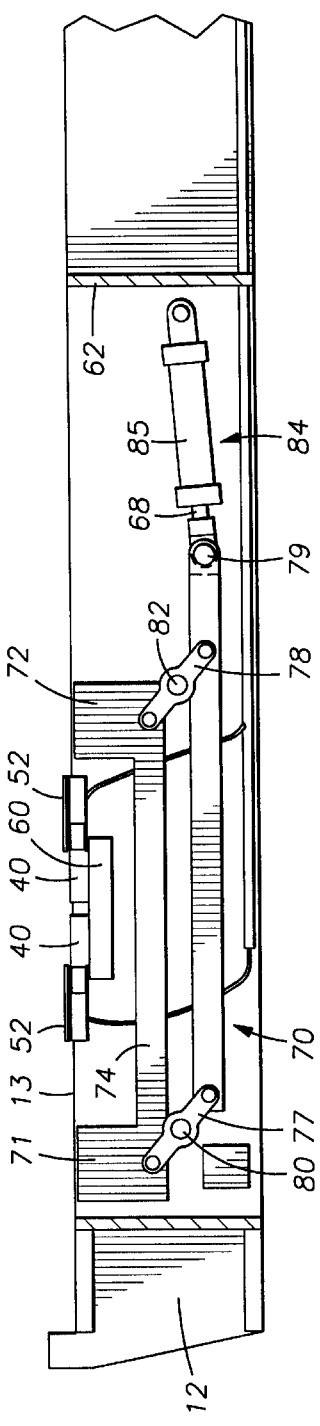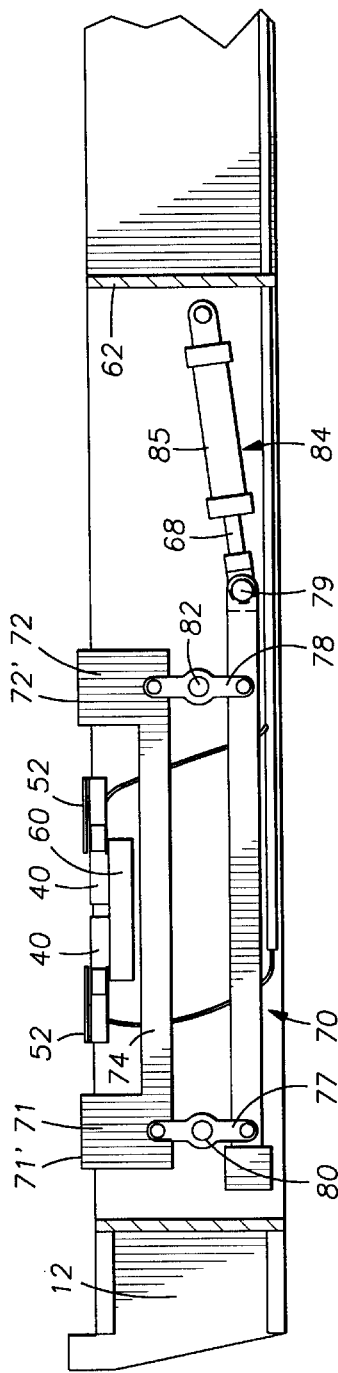

5,861,580

LOAD CELL AND WEIGHING SYSTEM

FIELD OF THE INVENTION

The present invention is directed to a novel load cell for weighing heavy loads and a weighing system using four of the load cells on a scrap or trash truck. More specifically, the present invention is directed to a weighing system on a front-end loader refuse truck for weighing scrap metals or trash in containers lifted by arms or forks on which a plurality of the novel load cells are mounted.

BACKGROUND OF THE INVENTION

U.S. Pat. No. 2,935,213 discloses a weighing scale using strain gage networks carried in certain load cells disposed in the tines of a fork type lift vehicle. A bar disposed in the tines with a central raised portion permits deflection in a vertical plane and four load cell assemblies are provided for the bar.

U.S. Pat. No. 3,059,710 discloses a fork lift weighing apparatus employing electrical strain response means for weighing a load with a reasonable degree of accuracy regardless of where the load is placed on the fork tines.

U.S. Pat. No. 3,063,576 discloses the use of two load cells each having a single tension gauge and two load cells having a single compression gauge connected where each cell is one of the four legs of a Wheatstone bridge so that the summation of the responses from the four cells indicates the correct total weight of a given load.

U.S. Pat. No. 3,196,966 discloses load measuring devices on a fork lift truck which has spaced front and back plates with the front plate carrying the forks and the back plates secured to a mounting plate or mounting straps on a truck. Relative vertical and horizontal movement of the front and back plates is limited to avoid damage to the flexure strips and to the load cell.

U.S. Pat. No. 3,910,363 discloses a weighing device for use with a fork lift truck having a stationary plate and a moveable plate and at least one load cell interposed between the moveable and stationary plates.

U.S. Pat. No. 4,323,132 discloses a mounting adapter which provides a quick attachment for mounting or removing an electro-mechanical scale with respect to the lift frame of a fork lift truck.

U.S. Pat. No. 4,420,053 discloses a weighing apparatus for fork lifts comprising a weight bridge supported at each end by load cells, the weight bridge and load cells are built into the fork.

U.S. Pat. No. 4,421,186 discloses a fork lift scale which consists of horizontally disposed load sensors connecting a crossbar frame to the crossbars of a fork lift truck.

U.S. Pat. No. 4,638,876 discloses a weighing apparatus for weighing eccentric loads for use with a forklift which has a weighing plate, three weight measuring systems or weighing cells engage the weighing plate.

U.S. Pat. No. 4,666,004 discloses a pallet truck with a fork member movable in an up-and-down manner which is provided with a plurality of load cells on the tines of the fork member.

U.S. Pat. No. 4,714,122 discloses pressure load cells with "an upwardly extending sensing element 56 which protrudes from the main body of the load cell . . . . Each sensor 56 is biased upwardly relative to the main body of the load cell and is forced into the main body of the load cell by the downward pressure on the sensing element. The greater the weight or pressure on the sensing element, the greater the movement of the sensing element into the body of the load cell." Also disclosed, a limit switch is operatively connected to the transducer so that the transducer is energized at a point when a full container is supported by the lifting means and when an empty container is supported by the lifting means for the purpose of determining the weight of the refuse in the container.

U.S. Pat. No. 4,771,837 discloses a weighing system on a refuse truck which has a hydraulically actuated lifting means and a fluid pressure transducer which is operatively connected to the hydraulically actuated lifting means for sensing the weight of a refuse container when the container is lifted and lowered by the lifting means.

U.S. 4,854,406 discloses the weighing systems of U.S. Pat. No. 4,714,122 and U.S. Pat. No. 4,771,837 with emphasis on the electrical control system.

U.S. Pat. No. 4,899,840 discloses a weighing apparatus for a vehicle having tines in which a ramp is mounted on each tine in front of and in spaced relation to a weighing load bearing plate.

U.S. Pat. No. 5,245,137 discloses a method for determining a weight of material being emptied from a container.

SUMMARY OF THE INVENTION

The present invention is directed to a novel load cell for weighing heavy loads and a weighing system using the novel load cells on a vehicle, such as a refuse truck. More specifically, the present invention is directed to a weighing system on a front-end loader refuse truck for weighing scrap metals or trash in boxes or containers lifted by arms or forks on which a plurality of the novel load cells are mounted. In addition, a protection mechanism may be activated to protect the load cells from a falling container when the container is lifted over the truck for dumping the contents into the truck or when the arms or forks are placed into the sleeves of the container to be weighed.

BRIEF DESCRIPTION OF THE DRAWING

FIG. 4 is a top view of one of two forks of a scrap or trash truck with two load cells mounted on the side of the fork illustrating half of the weighing system of the present invention;

FIG. 5 is a side view of the weighing system and a safety guard for the load cells in the normal or off position exposing the load cells above the fork;

FIG. 6 is a side view of the weighing system and a safety guard for the load cells in the extended or on position protecting the load cells to any load on the fork.

DESCRIPTION OF THE PREFERRED EMBODIMENTS

The present invention is directed to a weighing system for a vehicle having a pair of forwardly-extending arms or tynes to weigh any load lifted by the arms. The major problem of the weighing systems of the prior art is that the design of the load cells could not withstand the dropping of heavy weigh on the cells or weighing structure. The present invention utilizes a novel load cell which by its construction is sturdy and can withstand the rigors of a field weighing system. The load cell of the present invention has a bearing plate above that part of the load cell having the electrical and mechanical system (the bridge) which largely overcomes the problem of the prior art and protects the load cells of the present invention. More specifically, the present invention is directed to a weighing system on a front-end loader refuse truck for weighing scrap metals or trash in boxes or containers lifted by arms or forks on which a plurality of the novel load cells are mounted. In this preferred embodiment of the present invention, a further protection mechanism is utilized which protects the load cells especially from the dropping of large boxes on the surface of the cell in the dumping cycle.

Figure 1:
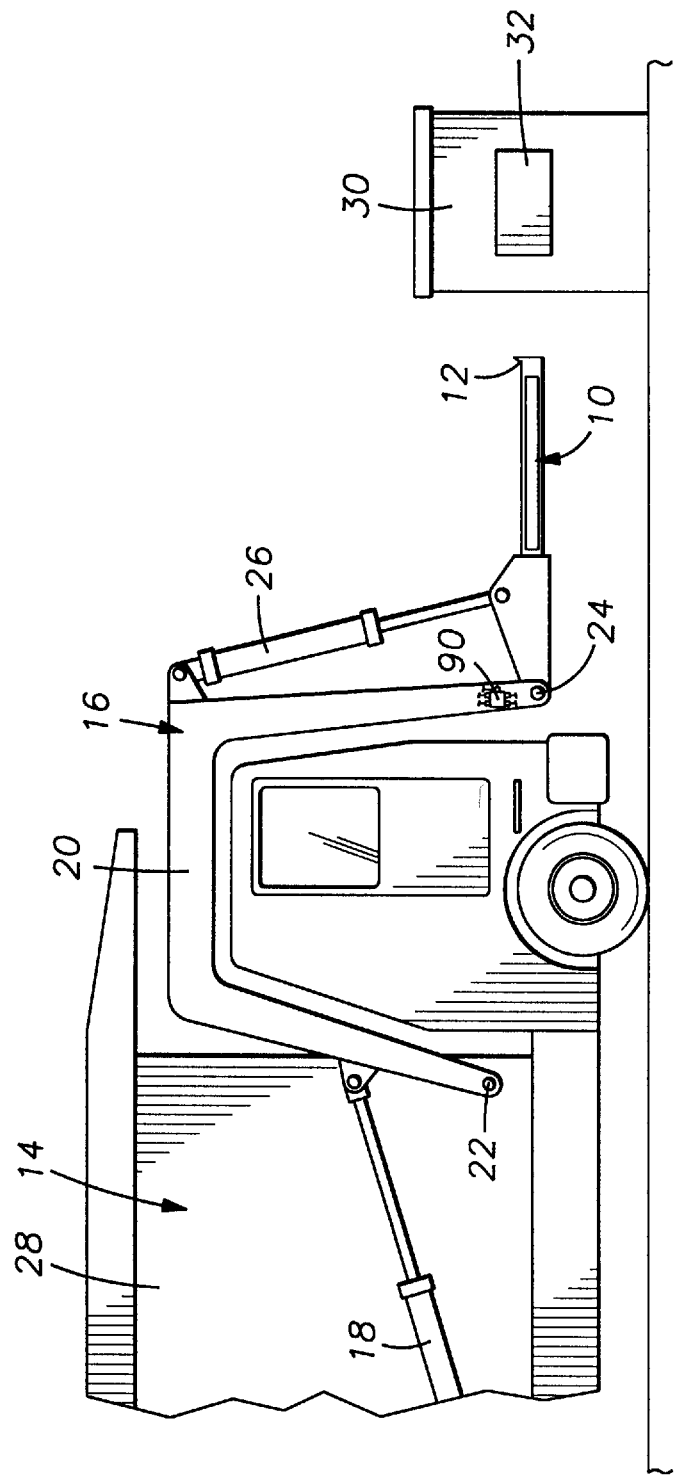
FIG. 1 is an elevation view of a scrap or trash truck with the load cells of the present invention mounted on the lifting arms or forks of the truck.

Referring to FIG. 1, the weighing system 10 in the prefered embodiment of the present invention is attached to the pair of front-end extending arms 12 of a front end loading refuse truck 14. Truck 14 has a lifting mechanism 16 which includes a pair of hydraulically operated actuators 18 on each side of the truck 14 which raises and lowers boom 20. The boom 20 is pivotally connected to the side of truck 14 by a pivot pins 22. The front-end extending arms 12 are pivotally connected to the boom 20 by pins 24 and moved by hydraulically operated actuators 26. The truck driver can control the operation of the actuators 18 and 26 independently throughout a dumping operation.

The truck 14 is driven toward a container or box 30 to be serviced which may be filled with scrap metal or trash which is to be placed in a container 28 on the truck 14. The container 28 on the truck 14 has an opening (not shown) into which the scrap metal or trash in the box 30 is dumped. The dumping operation is no different than practiced conventionally, i.e. the arms 20 are positioned by the driver so they are in horizontal alignment with the sleeves 32 on the box 30 and the truck moved toward the box 30 until the arms 20 enter the sleeves 32. The boom 20 is activated to lift the box 30 above the truck 14 and when it reaches the dumping position the arms 12 are activated by the driver so that the open top of the box 30 faces down toward the opening in the container 28.

Figure 2:
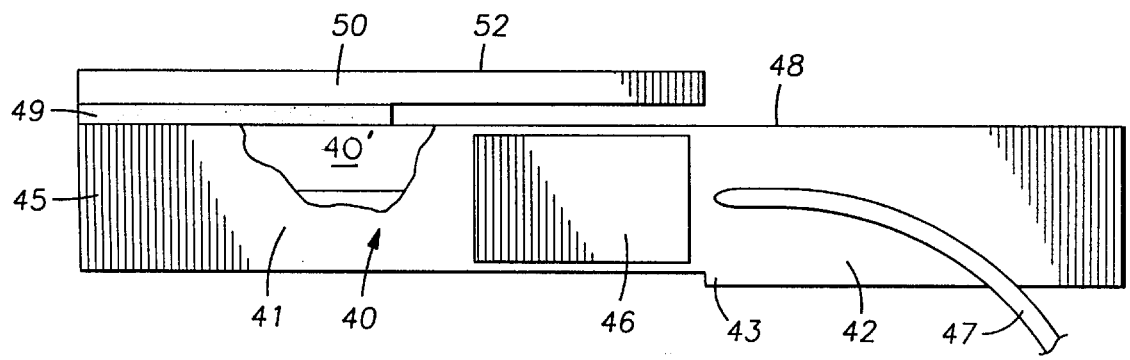
FIG. 2 is a side view of a load cell of the present invention.
Figure 3:
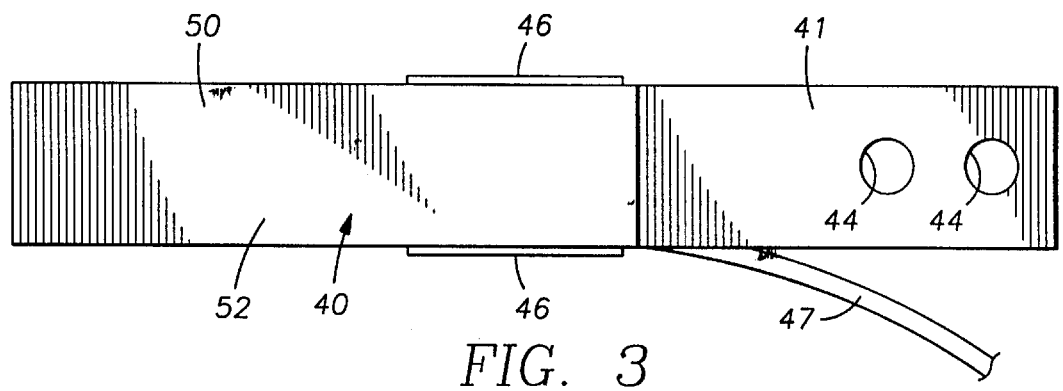
FIG. 3 is a top view of a load cell of the present invention.

One aspect of the present invention is the novel load cells used in the weighing system. Referring to FIGS. 2 and 3, the load cell 40 of the present invention is a modification of a load cell manufactured by Coti, Inc. identified as ST 3 as set forth in their brochure, which is incorporated herein by reference. The preferred cell is a 10K load capacity and is calibrated for positive polarity in compression. The Coti load cell is the bottom portion of the cell as shown in the side view of FIG. 2 and consists of the stainless steel body 41 which is rectangular in shape. At one end 42, a foot 43 provides a solid base when bolted to a foundation by bolts placed through openings 44 to cantilever the other end 45 from the foundation. The cell has a bridge 40' within the body 41, having covers 46 to secure the strain gages and electrical circuits of the bridge. A conductor cable 47 from the bridge conducts the electrical signal which is proportional to the compression (weight) placed on the end 45. The load cell of the present invention modifies the Coti load cell by adding a bearing plate 50 welded to the upper surface 48 of the body 41. The plate 50 extends over the upper surface 48 beyond the weld 49 and protects the body 41 from any load. The upper surface 52 of the bearing plate 50 thus provides the only surface for any load placed on the load cell and protects the body 41 from any dropped load. In the event of a very large load such as the scrap iron or trash boxes 30, more than one cell 40 is utilized to provide sufficient bearing surfaces 52 of the bearing plates 50 to support the large load. Each load cell 40 measures the compression (weight) on the bearing surface 52 and the accumulation of the weights will provide the total weight of the load placed on the load cells. The utilization of the load cells 40 is illustrated in the preferred embodiment of the weighing system of the present invention.

Referring now to FIGS. 4, 5 and 6, one of the front-end extending arms 12 of a refuse truck has two load cells 40 mounted outside and adjacent the arm 12 on a foundation 60. The foundation is a metal bar welded between the arm 12 and a housing 62 which surrounds and protects the weighing system. The bar or foundation 60 may have an indentation (not shown) in which the cell 40 seats so there is no rotation of the cell 40 when the cell is bolted to the bar by bolts placed through openings 44. As illustrated, the cells 40 are positioned so that the bearing surfaces 52 are above the upper surface 13 of arm 12 and preferably positioned so that the bearing surfaces 52 are nearest the front end and back end of arm 12, providing the greatest distribution of bearing surface area on which the box 30 will sit when weighed. To weigh the contents of a box 30, the arm 12 is inserted into the sleeve 32 and the box 30 lifted from the ground so that the total weight of the box is on the four bearing surfaces 52 of the four load cells 40, two on each arm 12. After the contents of the box 30 are dumped into the container 28 of truck 24, the empty box 30 is again weighed and the difference in weight is the weight of the contents dumped. A serious problem which is present in the systems of the prior art is that when the box 30 is lifted over the truck 14 to be dumped, the box 30 drops from being supported on the bottom of sleeve 32 to a position of being supported on the top of arm 12. The drop is only inches but the weight of a box 30 is such that even that drop will over time seriously affect the calibration of any load cell on which such a weight is repeatedly dropped. The load cells 40 of the weighing system of the present invention can withstand this problem; however, additional protection is provided by protection mechanism 70. Protection mechanism 70 preferably includes a pair of blocks 71 and 72 mounted in housing 62 adjacent arm 12, one block 71 positioned in front of the load cells 40 and the other block 72 positioned in back of both load cells 40. The blocks 71 and 72 are connected by a first member 74 which may be a rod or bar. A second member 76, which also may be a rod or bar, is connected to the first member 74 by two link plates 77 and 78 which are pivotally around pins 80 and 82, respectively. Rods 80 and 82 extend from the outside of housing 62 to the opposite side of arm 12. A hydraulic actuator 84 which may be a piston with a cylinder 85 and a rod 86 is attached to the second member 76 by a pin 79. When the actuator 85 is activated by the driver of the truck 14, the members 74 and 76 are moved from the position of FIG. 5 to that of FIG. 6 where member 76 moves until it abuts stop 88 and the connections link plates 77 and 78 to the members 74 and 76 are vertically aligned to the rods 80 and 82. In this position, the blocks 71 and 72 are raised and the upper surfaces 71' and 72' are above the upper surface 52 of the bearing plates 50 of the load cells 40. The driver of the truck activates the actuator 85 during the dumping cycle after the weighing of the contents and before the box 30 starts downward after dumping the contents in the container 28 of truck 14. The actuator 85 may also be activated at any time to protect the load cells 40, such as lifting a full box 30 which may be bumped or jarred when it is carried by the extending arms 12 of the truck 14. There are many situations where the load cells 40 should be protected and the protection mechanism 70 provides such protection. There may be other alternatives to the specific protection mechanism 70 illustrated such as hydraulic jacks mounted within housing 62.

Figure 7:
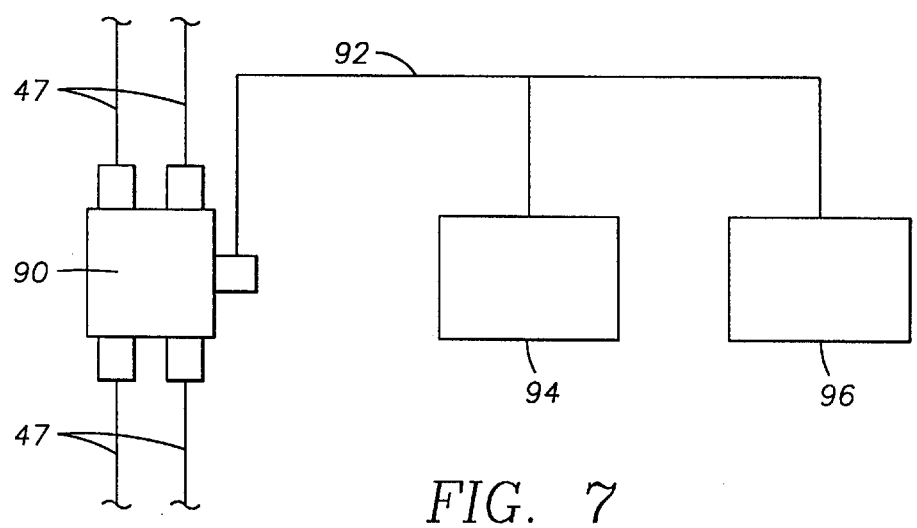
FIG. 7 is a schematic diagram illustrating the electrical connections to obtain the accumulation of the weights from the four load cells and the connection of the electrical signals to a digital screen in the truck and to a computer which can record the weight.

The individual cables 47 from each of the four load cells 40 are collected at a juncture box 90 on the boom 20 of truck 14. The juncture box 90 has chips which collect the individual analog signals from each load cell 40 and a collective signal is transferred to the cab of the truck 14 by cable 92. As illustrated in FIG. 7, the collected signal may to connected to a digital weigh read out device 94, such as a Model Programmable Weigh Indicator (PWI) available from GSE Scale Systems, or a panel mounted controller and printer 96, such as a PLI80RM series panel mount printer for instrumentation and data logging available from TELPAR, INC., Addison, Tex. With these devices in the cab of the truck 14 a driver can record the weight of the material dumped into the container 28 on the truck 14, provide the information to a person at the site of the box 30 and record the information for billing purposes.

We claim:

1. A weighing system on a vehicle which comprises:

a pair of forwardly-extending arms on said vehicle, each arm having an upper surface;

a plurality of load cells, said load cells mounted adjacent each of said arms and having a solid body with a bridge within said body calibrated to measure the weight of an object on said body; and a bearing plate welded to an upper surface of said body of said load cell, said plate extending over and above said upper surface of said body of said load cell beyond said weld on which said object to be weighed is placed.

2. A vehicle according to claim 1 wherein said body of said load cell is stainless steel.

3. A vehicle according to claim 1 which further includes:

protection means mounted forwardly and rearwardly of said load cells to provide a bearing surface above each upper surface of said load bearing plate of said load cells to protect said cells.

4. A vehicle according to claim 1 wherein there are two load cells adjacent each arm of said vehicle.

5. A vehicle according to claim 4 wherein each bearing plate extends in a direction toward the other cell.

6. A vehicle according to claim 1 which further includes:

an electrical system which connects the signals from the load cells to a digital read out.

7. A weighing system on a front-end loading refuse truck having a refuse container with a top opening and lifting means for engaging and lifting a refuse box from a position outside the truck to an inverted position above the opening, said truck having a pair of forwardly-extending arms having an upper surface for engaging said box, said weighing system comprising:

a pair of forwardly-extending arms on said truck, each arm having an upper surface;

a plurality of load cells, said load cells mounted adjacent each of said arms and having a solid body with a bridge within said body to measure the weight of an object placed on said cell; and a bearing plate welded to an upper surface of said body of said load cell, said plate extending over and above said upper surface of said load cell beyond said weld.

8. A truck according to claim 7 wherein said body of said load cell is stainless steel.

9. A truck according to claim 7 wherein there are two load cells adjacent each of said arms.

10. A truck according to claim 9 wherein each bearing plate extends in a direction toward the other cell.

11. A truck according to claim 9 which further includes:

protection means mounted forwardly and rearwardly of said load cells to provide a bearing surface above each upper surface of said load bearing plate of said load cells to protect said cells.

12. A truck according to claim 11 wherein said protection means comprises:

a pair of blocks having an upper bearing surface, one block positioned in front of said load cells and the other block positioned in back of said load cells; and means to raise said blocks from a position where said bearing surface of said blocks is below said bearing surface of said cells to a position where said bearing surface of said blocks is above said bearing surface of said cells.

13. A truck according to claim 12 wherein said means to raise said blocks includes a hydraulic cylinder.

14. A truck according to claim 12 wherein said means to raise said blocks comprises:

a first member extending between and attached to said blocks;

a second member below said first member;

pivotally connecting means including connecting pins for connecting said first and second members and raising said first member when said connecting pins are in vertical alignment; and a hydraulic piston connected to said second member to raise and lower said first member and said blocks.

15. A load cell which comprises:

a solid body with a bridge within said body calibrated to measure the weight of an object placed on said body; and a bearing plate welded to the upper surface of said body of said load cell, said plate extending over and above said upper surface of said body of said load cell beyond said weld.

16. A load cell according to claim 15 wherein said solid body is stainless steel.

\* \* \* \* \*